(12) United States Patent
Freyer et al.

(10) Patent No.: US 11,289,702 B2
(45) Date of Patent: Mar. 29, 2022

(54) MINIATURE BATTERY WITH CONSTANT ELECTRODE PRESSURE AND ELECTROLYTE RESERVOIR

(71) Applicant: LITRONIK BATTERIETECHNOLOGIE GMBH, Pirna (DE)

(72) Inventors: Nico Freyer, Tauscha (DE); Michael Roch, Pirna (DE); Roland Staub, Bad Gottleuba-Berggiesshuebel (DE); Tim Traulsen, Pirna (DE); Gerd Fehrmann, Prina (DE)

(73) Assignee: LITRONIK Batterietechnologie GmbH, Pirna (DE)

( * ) Notice: Subject to any disclaimer, the term of this patent is extended or adjusted under 35 U.S.C. 154(b) by 226 days.

(21) Appl. No.: 16/101,704

(22) Filed: Aug. 13, 2018

(65) Prior Publication Data

US 2019/0058190 A1    Feb. 21, 2019

(30) Foreign Application Priority Data

Aug. 17, 2017  (DE) .................... 10 2017 118 797
Oct. 20, 2017  (DE) .................... 10 2017 124 511

(51) Int. Cl.
    *H01M 4/505*      (2010.01)
    *H01M 6/08*       (2006.01)
    (Continued)

(52) U.S. Cl.
    CPC ............ *H01M 4/505* (2013.01); *C01G 45/02* (2013.01); *C01G 45/1228* (2013.01);
    (Continued)

(58) Field of Classification Search
    CPC ........ H01M 4/505; H01M 4/50; H01M 4/043; H01M 4/622; H01M 4/75; H01M 50/60;
    (Continued)

(56) References Cited

U.S. PATENT DOCUMENTS 4,020,242 A   4/1977  Okazaki et al.
6,190,800 B1  2/2001  Iltchev et al.
              (Continued)

FOREIGN PATENT DOCUMENTS

DE    60103124 T2     4/2005
DE    102006021158 A1  11/2007

OTHER PUBLICATIONS

Juergen Drews, et al.; Lithium-/Manganese Dioxide Medium Rate Batteries for Medical Applications; The Electronic Society, 215th Meeting; Year 2009; Abstract 1409.

*Primary Examiner* — Cynthia H Kelly
*Assistant Examiner* — Kirsten B Tysl
(74) *Attorney, Agent, or Firm* — Laurence A. Greenberg; Werner H. Sterner; Ralph E. Locher

(57) ABSTRACT

An electrochemical voltage source has an anode containing lithium, a cathode containing manganese oxide, and a housing. The cathode and the anode are arranged in an interior of the housing and are arranged opposite one another. An electrolyte reservoir in the form of a compressible storage body, which receives an electrolyte, is arranged between the anode and the cathode. The storage body has a first side resting against an end face of the cathode and a second side, which faces away from the first side, and rests against an end face of the anode. The cathode experiences an increase in volume when the voltage source is discharged. The anode experiences a decrease in volume during the discharge. During the discharge, the absolute value of the volume increase of the cathode is at least as great as the absolute value of the volume decrease of the anode.

17 Claims, 3 Drawing Sheets

(51) Int. Cl.
- *H01M 4/50* (2010.01)
- *H01M 50/60* (2021.01)
- *H01M 50/107* (2021.01)
- *C01G 45/02* (2006.01)
- *C01G 45/12* (2006.01)
- *H01M 4/04* (2006.01)
- *H01M 4/62* (2006.01)
- *H01M 10/0525* (2010.01)
- *H01M 4/75* (2006.01)
- *H01M 6/16* (2006.01)
- *H01M 50/10* (2021.01)
- *H01M 50/545* (2021.01)
- *H01M 4/02* (2006.01)

(52) U.S. Cl.
CPC ............. *H01M 4/043* (2013.01); *H01M 4/50* (2013.01); *H01M 4/622* (2013.01); *H01M 6/08* (2013.01); *H01M 10/0525* (2013.01); *H01M 50/107* (2021.01); *H01M 50/60* (2021.01); *H01M 4/75* (2013.01); *H01M 6/16* (2013.01); *H01M 50/10* (2021.01); *H01M 50/545* (2021.01); *H01M 2004/021* (2013.01); *H01M 2300/0025* (2013.01)

(58) Field of Classification Search
CPC .. H01M 50/107; H01M 50/10; H01M 50/545; H01M 6/08; H01M 10/0525; H01M 6/16; H01M 2300/0025; H01M 2004/021; H01M 50/618; H01M 50/471–486; H01M 10/058; H01M 10/4214; C01G 45/02; C01G 45/1228; Y02E 60/10
See application file for complete search history.

(56) References Cited

U.S. PATENT DOCUMENTS

| | | | |
|---|---|---|---|
| 7,771,873 B2 | 8/2010 | Nunome et al. | |
| 7,794,882 B2 | 9/2010 | Drews et al. | |
| 9,553,296 B1* | 1/2017 | Dai | H01M 2/06 |
| 9,718,997 B2* | 8/2017 | Cyman, Jr | C09J 133/14 |
| 2011/0223477 A1* | 9/2011 | Nelson | H01M 4/364 |
| | | | 429/206 |

* cited by examiner

MINIATURE BATTERY WITH CONSTANT ELECTRODE PRESSURE AND ELECTROLYTE RESERVOIR

CROSS-REFERENCE TO RELATED APPLICATION

This application claims the priority, under 35 U.S.C. § 119, of German applications DE 10 2017 118 797.9, filed Aug. 17, 2017, and DE 10 2017 124 511.1, filed Oct. 20, 2017; the prior application is herewith incorporated by reference in its entirety.

BACKGROUND OF THE INVENTION

Field of the Invention

The present invention relates to an electrochemical voltage source according to the main claim.

A voltage source of this kind can have one or more lithium anodes and one or more cathodes with manganese dioxide as electrochemically active component.

U.S. Pat. No. 7,771,873 B2 describes a primary battery (for example for digital cameras) with a zinc anode and an aqueous alkaline electrolyte, wherein it is aimed to improve the discharge behavior by means of a cathode that consists of a specific composition of y-manganese oxide and A-manganese oxide. It is aimed to prevent the swelling of the cathode by using A-manganese oxide having a smaller grain size.

In Abstract 1409 of the $215^{th}$ ECS Meeting, it is described inter alia by Drews that the density of the cathode mass in batteries rises with increasing grain size of the manganese dioxide, and thus so too does the discharge capacity of the battery. The pulse load capability decreases at the same time.

Furthermore, U.S. Pat. No. 4,020,242 A discloses a battery in which a freely movable electrolyte is reduced in volume when pressure is exerted as a result of expansion of the cathode or anode. Furthermore, the expansion of the anode or the cathode can be compensated for by a contraction of an electrically conductive spacer.

Higher tolerances are required as a result of the construction of electrode assemblies in stack design, and therefore it is generally not possible to fill the housing completely with electrode components.

In particular, in the case of relatively large electrode thicknesses, points can form that are not wetted by an electrolyte and that lead accordingly to zones that cannot be discharged or that can only be poorly discharged. Furthermore, the maximum pulse load capability can decrease at the discharging endpoint of the battery on account of the reducing lithium anode surface.

SUMMARY OF THE INVENTION

On this basis, the object of the present invention is therefore to create an electrochemical voltage source (battery) that has the highest possible packing density of the cathode for the highest possible battery capacity and for the most uniform possible pulse load capability up to the discharging endpoint.

This object is achieved by an electrochemical voltage source having the features of the independent claim. Advantageous embodiments of the invention are specified in the dependent claims and will be described hereinafter.

In accordance with the invention, an electrochemical voltage source, in particular for an implantable battery-operated device, is disclosed, having:

a) an anode comprising lithium,
b) a cathode comprising manganese oxide (in particular manganese dioxide),
c) a housing, wherein the cathode and the anode are arranged in the housing and are arranged opposite one another,
d) an electrolyte reservoir in the form of a compressible storage body, which is configured to receive an electrolyte, and wherein the storage body is arranged between the anode and the cathode, with a first side resting against an end face of the cathode and with a second side, which faces away from the first side, resting against an end face of the anode, wherein the end face of the anode faces towards the end face of the cathode, and
e) an electrolyte, which is received at least in part in the storage body, wherein the storage body in particular has pores for receiving the electrolyte (the storage body can be formed for example in the manner of a sponge).

In accordance with the invention it is now provided that the storage body consists of an electrically insulating material and that the cathode is configured to experience an increase in volume when the voltage source is discharged. The anode is configured to experience a decrease in volume during the discharge, and, at any time during the discharge, the absolute value of the volume increase of the cathode that has occurred up to that point is at least as great, in particular exactly as great as the absolute value of the volume decrease of the anode that has occurred up to that point.

The cathode in other words is in particular configured such that reliable contact between the cathode and the current dissipation is ensured continuously during the discharge. To this end, it is provided in particular that the cathode swells at least to the same extent as the volume loss of the anode. Furthermore, it is ensured in particular that the swelling cathode is always supplied sufficiently with electrolyte.

Due to the stack design or configuration according to the invention of the cathode, anode and of the storage body and the volume increase behavior of the cathode and volume decrease behavior of the anode, the internal volume of the housing can be utilized practically completely. During the discharge and thus swelling of the cathode, the cathode in particular presses continuously against the anode via the storage body. The spacing and electrode pressure on the current collector thus remain practically constant, which leads to constant discharge conditions. The maximum electrical load capability can thus be maintained up to the discharging endpoint. The necessary degree of swelling of the cathode is dependent on the density of the cathode mass (see FIG. 1).

In accordance with one embodiment it is provided that the storage body is resiliently compressible or deformable.

In accordance with one embodiment of the invention it is also provided that predominantly manganese is present in the manganese oxide, in particular at least to an extent of 90%, in the oxidation stage +4, wherein the manganese oxide is in particular electrolytically produced $\gamma$-$MnO_2$, which in particular was heat treated prior to use. In other words held at a predefined minimum temperature over a predefined period of time, wherein the period of time can lie for example in the range of 3 to 6 hours, wherein for example the temperature can lie in the range of 350° C. to 400° C.

Furthermore, it is provided in accordance with one embodiment of the invention that the manganese oxide has a BET surface area in the range of from 15 m²/g to 20 m²/g. The BET surface area value is determined by means of the known BET measurement according to DIN ISO 9277: 2003-05.

In accordance with one embodiment it is preferably provided that the cathode is pressed from the manganese oxide, wherein the manganese oxide is a mixture of at least a first and a second powdered fraction, wherein the first fraction is formed of finer grains as compared to the second fraction.

In particular, the mixture is part of a cathode mass that is pressed onto a carrier of the cathode forming a collector, wherein the cathode mass, apart from the mixture, can contain further additives, wherein the additives can be in particular binders or conductive additives. For example, one of the following or a plurality of the following substances can be used as a binder: PTFE, PVDF or PE. For example, one of the following or a plurality of the following substances can be used as conductive additives: carbon black, graphite, expanded graphite, carbon fibers or metal powder.

In accordance with an embodiment of the invention it is also provided that the cathode mass or the mixture contains two different grain size fractions of manganese dioxide, wherein the first fraction has a mean grain size of from 30 µm to 40 µm, in particular 35 µm, and the second fraction has a mean grain size of from 65 µm to 75 µm, in particular 70 µm. The first fraction in accordance with an embodiment of the invention is contained in the mixture in a proportion of from 15% to 50%, in particular 25%. Furthermore, in accordance with an embodiment of the invention the second fraction is contained in the mixture in a proportion of from 50% to 85%, in particular 75%. The separation of the manganese dioxide powder into various fractions can be performed by screening, sifting or other known methods. The proportions of the first and second fraction of the mixture add up in particular to give 100%.

Furthermore, it is provided in accordance with an embodiment of the present invention that the storage body comprises one of the following materials or is formed from one of the following materials: a non-metal material, a polymer, polyamide, polyethylene, or polypropylene.

Furthermore, in accordance with an embodiment of the invention it is provided that the housing has an inner side facing towards the cathode, which inner side has an electrically insulating surface layer, wherein in particular the surface layer comprises a parylene or is formed from a parylene.

The parylene is a substance according to the following structural formula:

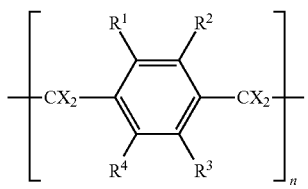

Here, X can be equal to hydrogen, and $R^1$ to $R^4$ can be equal to hydrogen (parylene N).

Furthermore, X can be equal to hydrogen, $R^1$ can be equal to chlorine, and $R^2$ to $R^4$ can be equal to hydrogen (parylene C).

Furthermore, X can be equal to hydrogen, $R^1$ and $R^3$ can be equal to chlorine, and $R^2$ and $R^4$ can be equal to hydrogen (parylene D).

Furthermore, X can be equal to fluorine, and $R^1$ to $R^4$ can be equal to hydrogen (parylene HT).

Furthermore, in accordance with a preferred embodiment of the invention it is provided that the housing is hermetically sealed.

Furthermore, in accordance with an embodiment of the invention the housing comprises a cover with a through-opening, through which an electrically conductive pin is guided out from the housing, wherein the pin is electrically conductively connected to the cathode. The pin can comprise for example molybdenum or can be formed from molybdenum.

In order to insulate the pin with respect to the cover/housing it is provided in accordance with an embodiment of the invention that a portion of the pin arranged in the through-opening is surrounded by an insulating body. The insulating body can consist of a glass, for example.

Furthermore, it is provided in accordance with an embodiment of the invention that the electrochemical voltage source comprises a further electrolyte reservoir, in particular in the form of a further (in particular resiliently) compressible storage body, in which at least some of the electrolyte is received, and which in particular can consist of the same material or can comprise the same material as the storage body of the at least one electrolyte reservoir (see above). The further storage body is preferably arranged between the cover and the cathode, wherein the further storage body rests against both the cover and the cathode. The further storage body is likewise arranged preferably coaxially with the cathode, with the anode, and with the other storage body. The further storage body is furthermore likewise preferably cylindrical.

In accordance with a further embodiment of the invention it is provided that the anode is electrically conductively connected to an end portion of the housing, in particular via a dissipation grid.

In accordance with an embodiment of the present invention it is provided that the end face of the cathode has an equivalent diameter that is smaller than the length of the cathode along a longitudinal axis of the cathode. The equivalent diameter of the end face is calculated here from the area-equivalent diameter of a circle having the same overall area as that of the end face.

In particular, the end face of the cathode can have a circular, oval or also irregularly shaped base area. Polygonal base areas are also possible, in particular rectangular base areas or also triangular base areas in the case of prismatic cathodes, for example.

In accordance with a further embodiment of the present invention it is provided that the cathode and/or the anode are each cylindrical, wherein the cathode and the anode are preferably arranged coaxially with a longitudinal axis of the housing. The storage body is furthermore preferably arranged coaxially with the cathode and the anode. The storage body is preferably also cylindrical. An advantage of this cylindrical, coaxial design is the simpler production by means of the symmetrical shaping.

Furthermore, in accordance with an embodiment of the invention it is provided that the housing is formed in an elongate manner in the direction of its longitudinal axis, wherein the cathode is preferably arranged coaxially with the longitudinal axis and likewise is formed in an elongate manner in the direction of the longitudinal axis. Here, the term "in an elongate manner" in the sense of the present invention means that the housing or the cathode has a greater extent in the direction of the longitudinal axis than in all directions perpendicular to the longitudinal axis.

A further aspect of the present invention relates to a battery-operated device having an electrically operated functional unit and an electrochemical voltage source according to the invention for operation of the functional unit.

In accordance with one embodiment, it is preferably provided here that the battery-operated device can be implanted in a human or animal body, wherein in particular the battery-operated device is one of the following devices: a cardiac pacemaker, a neurostimulator, a drug pump, or a biomonitor.

Other features which are considered as characteristic for the invention are set forth in the appended claims.

Although the invention is illustrated and described herein as embodied in a miniature battery with constant electrode pressure and electrolyte reservoir, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
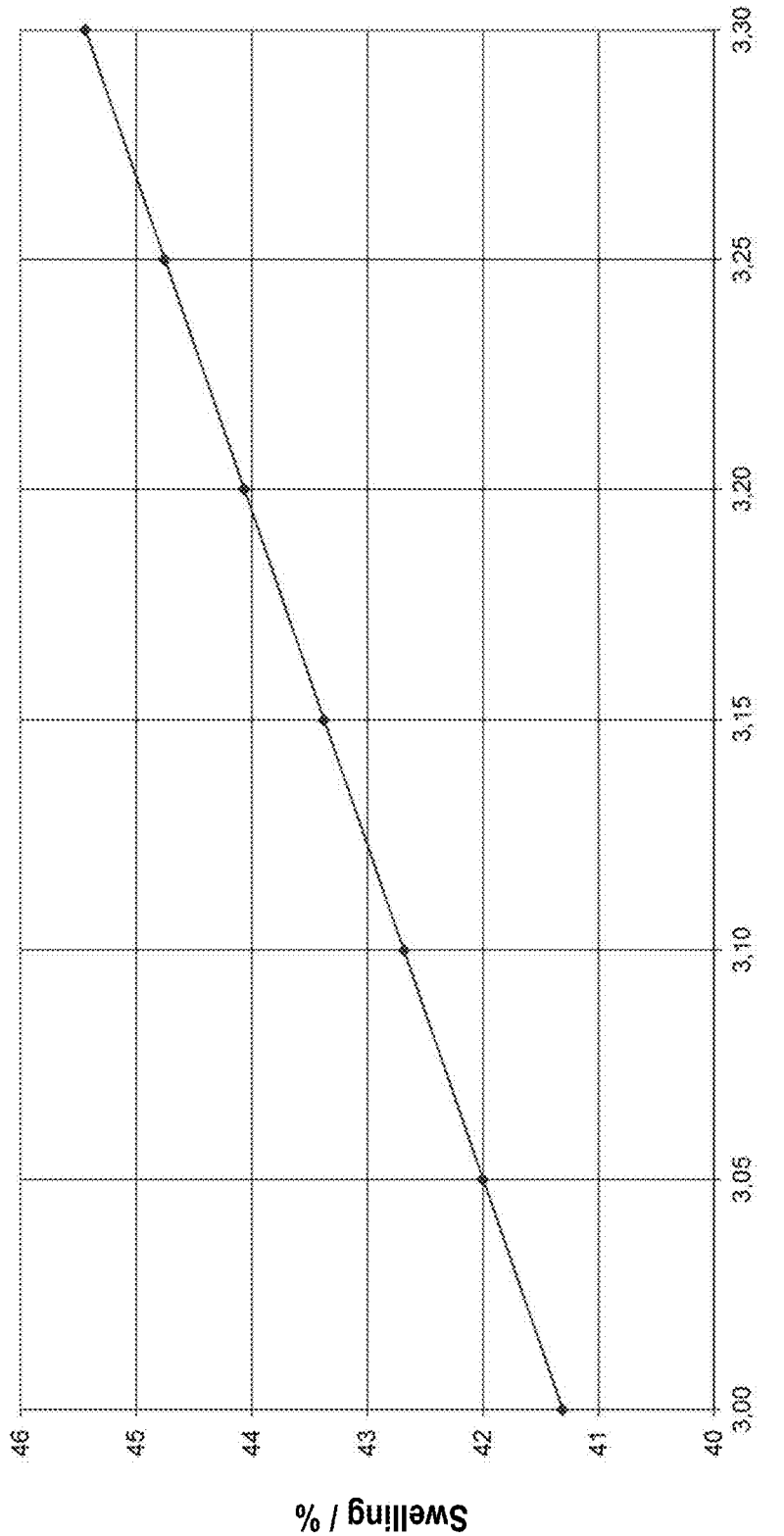
FIG. 1 is a graph illustrating a swelling of a cathode (%) over a density of the cathode mass (g/cm$^3$)
Figure 2:
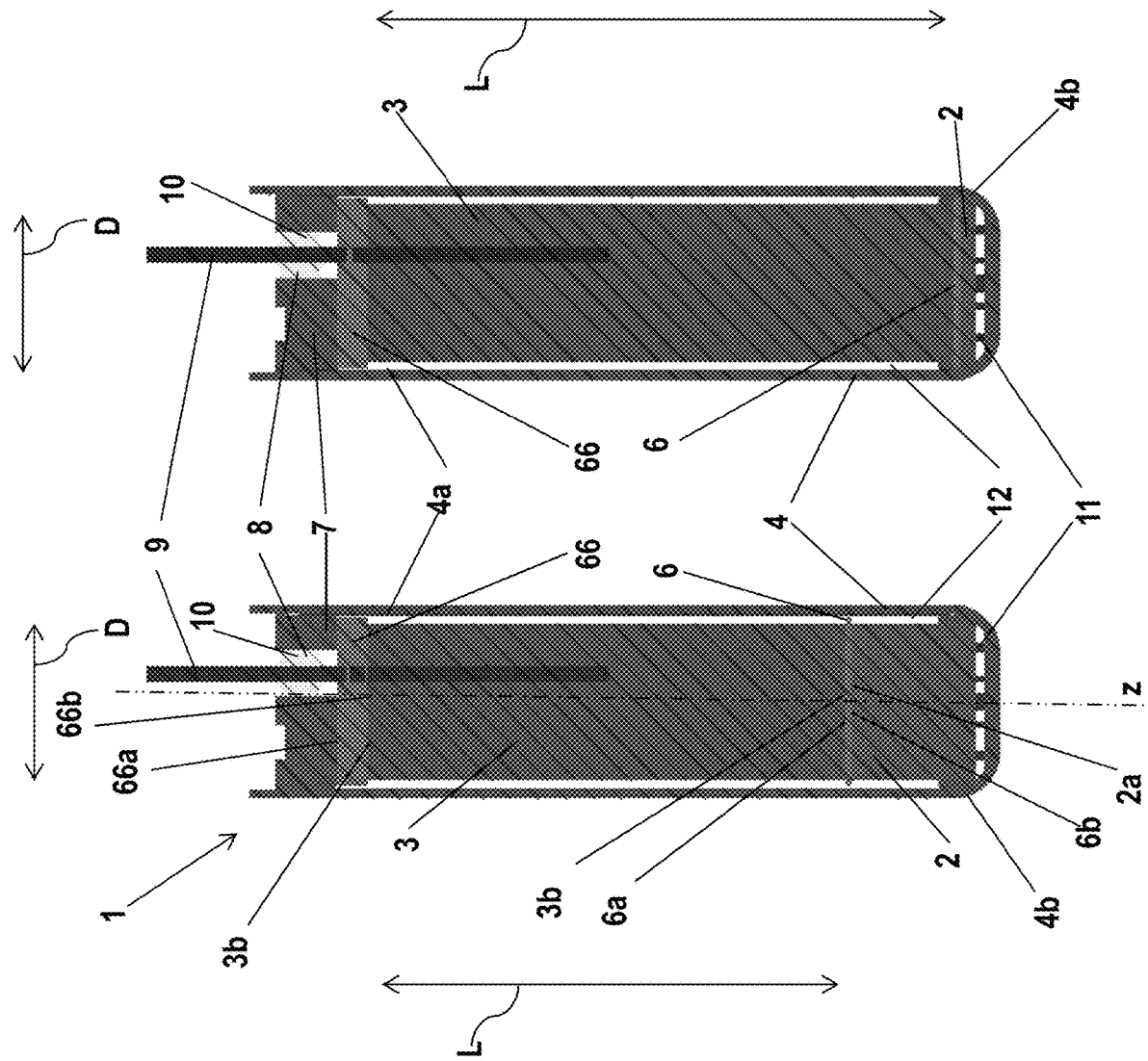
FIGS. 2A and 2B are schematic sectional views of an electrochemical voltage cell according to the invention at a start (FIG. 2A) and at an end (FIG. 2B) of a discharge of the voltage source.

Referring now to the figures of the drawings in detail and first, particularly to FIGS. 2A and 2B thereof, there is shown an electrochemical voltage source (also referred to herein as a battery) provided with the reference sign 1. An embodiment of a battery of this kind is shown, more specifically at a start of a discharge of the battery 1 (FIG. 2A) and at an end of the discharge (FIG. 2B).

The voltage source 1 comprises an anode 2 comprising lithium and a cathode 3 comprising a manganese oxide. The two electrodes 2, 3 are arranged in an interior of a housing 4, wherein the cathode 3 and the anode 2 are arranged opposite one another. The battery 1 also comprises an electrolyte reservoir in the form of a compressible storage body 6, which receives an electrolyte, wherein the storage body 6 is arranged between the anode 2 and the cathode 3, with a first side 6a resting against an end face 3b of the cathode 3 and with a second side 6b, which faces away from the first side 6a, resting against an end face 2a of the anode 2, wherein this end face 2a of the anode 2 faces towards the end face 3b of the cathode 3.

During the discharge, the following processes take place at the electrodes 2, 3 of the battery 1. Lithium ions and electrons are produced at the anode 2 comprising lithium

wherein the charge carriers produced in this way are received by the cathode:

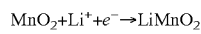

The anode 2 is thus dissolved during the discharge, and the lithium ions migrate through the electrolyte to the cathode 3 and are incorporated in the manganese dioxide grid. Due to the incorporation of the lithium ions, the manganese dioxide grid or the cathode 3 is expanded.

During the discharge, there is thus a swelling of the manganese dioxide grains or of the cathode 3, the swelling being defined by the material, such that the grains or cathode experience(s) an increase in volume. By contrast, the anode 2 experiences a decrease in volume.

In accordance with the invention it is now provided that the storage body 6 formed of an electrically insulating material and that furthermore the cathode 3 and the anode 2 are configured such that, at any time during the discharge, the absolute value of the volume increase of the cathode 3 that has occurred up to that point is at least as great as the absolute value of the volume decrease of the anode 2 that has occurred up to that point. The volume increase preferably corresponds to the volume decrease or compensates for this exactly.

In other words, the swelling of the cathode is at least as great as the volume loss of the anode. The contact pressure of the anode 2 against the cathode 3 is thus maintained. Good contact within the cathode mass and with the collector of the electrode 3 is ensured up to the discharging endpoint.

The cathode 3 in accordance with an embodiment is produced by mixing and pressing manganese dioxide, preferably γ-MnO$_2$, and for example PTFE as binder and expanded graphite as conductive additive onto a titanium collector for current dissipation.

In the state in which it is provided by the manufacturer, manganese dioxide generally contains particles within a very broad grain size spectrum. With a mean grain size of 35 μm, the material typically contains more than 10% particles with a grain size below 10 μm and approximately 10% particles with a grain size above 100 μm. If cathodes are pressed with this material, the structure of the cathode is predefined by the coarse particles. During discharge, small particles can then swell as a result of the incorporation of lithium, without significantly expanding the cathode. The overall swelling of the cathode is lower than with use of material of the composition according to the invention.

In the case of an unfavorable grain size distribution, the swelling of the cathode can furthermore be lower than the volume loss of the anode. In the battery, the contact pressure of the anode against the cathode is lost. This can lead to contact problems between the less conductive manganese dioxide particles and to a loss of contact with the collector. The result is a rise in the internal resistance of the battery and incomplete discharge.

In accordance with an embodiment of the invention two different fractions of the manganese dioxide are therefore mixed for cathode production, wherein the two factions have a different mean grain size.

In order to achieve a good packing density of the cathode 3, two fractions with typical mean grain sizes of 35 μm and 70 μm are mixed and in particular are pressed with a conductive additive and binder to form an electrode 3.

The fine-grain portion (first fraction) with a mean grain size for example of 35 μm and for example 25% proportion by mass is in particular selected in terms of its amount and grain size such that the material is incorporated as fully as possible into the cavities of the course-grain portion (second fraction) as the electrode 3 is pressed.

In this way, it is achieved in particular that the swelling of the electrode 3 during the discharge cannot take place in the pores of the electrode 3.

The other components of the electrode 3, for example graphite as conductive additive and PTFE as binder, are likewise dimensioned in terms of their grain size such that they do not exceed the mean grain size of the fine-grain manganese dioxide fraction and therefore do not have a porosity-increasing effect on the electrode 3.

In accordance with an embodiment a material of high crystallinity and thus low BET surface area of preferably 15 to 20 $m^2/g$, which swells to a greater extent during the discharge, is thus used as manganese dioxide.

During the discharge (in this regard FIG. 2A shows the starting state and FIG. 2B shows the end state, after completed discharge), in particular new pores are created in the material of the cathode 3 due to the swelling of the manganese dioxide particles in the cathode 3. These pores have to be filled with electrolyte for complete discharge. An excess of electrolyte is thus advantageously provided at the start of the discharge and is absorbed by the cathode 3 with increasing discharge depth.

Freely movable excess electrolyte is generally undesirable in batteries because it can lead to critical chemical side reactions. Thus, the excess of electrolyte is stored by the compressible storage body 6 and as necessary by a further storage body 66. This material for example can be a sponge or non-woven material made of polyam ides, polyethylene or polypropylene (see also above).

The battery 1, more specifically, can be formed in accordance with FIGS. 2A, 2B as follows.

The housing 4 of the battery 1 is preferably hermetically sealed and is formed in an elongate manner in the direction of the longitudinal axis z of the housing 4, the cathode 3 and the anode 2 each being arranged coaxially with the longitudinal axis z and being arranged opposite one another in the direction of the longitudinal axis. Here, the cathode 3 is also formed in an elongate manner in the direction of the longitudinal axis z.

The cathode 3, the anode 2 and the storage body 6, which is arranged between the anode 2 and cathode 3 and is compressible in the direction of the longitudinal axis z, are preferably cylindrical. A peripheral gap 12 is preferably provided between an inner side 4a of the housing 4 and the anode 2 and between the inner side 4a and the cathode 2 and promotes growth of the cathode 3 downwardly, towards the anode 2.

The inner side 4a of the housing 2 preferably has an electrically insulating surface layer, which for example comprises a parylene or is formed from a parylene.

On a side of the cathode facing away from the anode 2, there is provided the further storage body 66, which is compressible in the direction of the longitudinal axis z. The further storage body 66 rests with a first side 66a on a cover 7 of the housing 4, which closes the housing 4. Furthermore, the further storage body rests with a second side 66b on an end face 3b of the cathode 3 facing towards the storage body 66 and the cover 7. The further storage body 66 can likewise be compressed by cathode growth in the axial direction or in the direction of the longitudinal axis z, wherein electrolyte exits accordingly from the further storage body and can soak into pores of the cathode 3.

In order to contact the cathode 3, the cover 7 also has a through-opening 8, through which an electrically conductive pin 9 is guided out from the housing 4, wherein the pin 9 is electrically conductively connected to the cathode 3 and extends along the longitudinal axis z. The pin 9 can be formed for example from molybdenum. In particular, a portion of the pin 9 arranged in the through-opening 8 is surrounded by an insulating body 10, such that the pin 9 is electrically insulated relative to the cover 7 or the housing 4. The insulating body can consist of a glass, for example.

The anode 2 is by contrast preferably connected electrically conductively to an end portion 4b of the housing 4 via a dissipation grid 11, wherein the end portion 4b is provided at an end of the housing 4 opposite the cover 7.

Hereinafter, the production of a cathode will be explained by way of example on the basis of two examples (Example 1 and Example 2), wherein Example 2 corresponds to a cathode according to the invention.

EXAMPLE 1

A cathode mass mixture was produced by mixing:
a) 95% manganese dioxide (EMD GH-PT, company TOSOH), tempered at 350° C. with a mean grain size of 38 μm (10%<2 μm, 10%>90 μm) in accordance with the delivered state,
b) 4% expanded graphite (BNB 90, Firma TIMCAL) with a mean grain size of 35 μm, and
c) 1% PTFE (TF 9207, company Dyneon).

Figure 3:
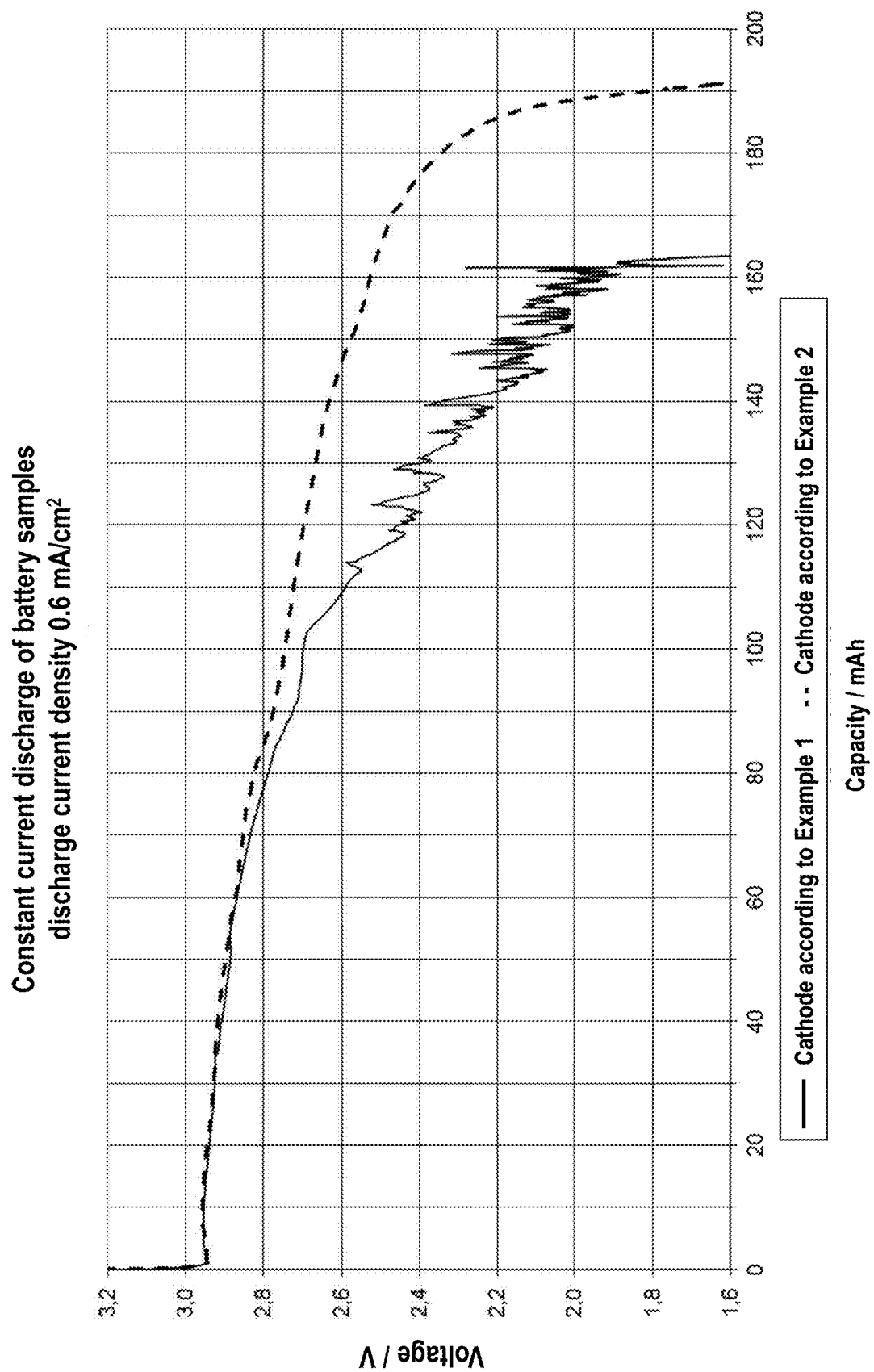
FIG. 3 is a graph showing the voltage (V) over the capacity (mAh) during a constant current discharge of batteries with cathodes according to Example 1 and Example 2, wherein Example 2 corresponds to a cathode according to the invention.

The powder mixture was pressed onto a titanium collector to form a cylindrical cathode of 0.2 $cm^2$ area and 15 mm height (in the direction of the longitudinal axis z). The density of the cathode mass was 3.08 $g/cm^3$. The cathode was tested in a battery in accordance with FIGS. 2A, 2B without storage body by discharge with 0.2 $mA/cm^2$. The results are shown in FIG. 3.

In the first part of the discharge the values corresponded to those expected. From approximately 50% discharge depth the voltage values became unstable. The expansion of the cathode during the discharge was too low, and failed to compensate for the volume loss of the anode. Due to a lack of contact pressure of the cathode mass, the electrical contact for current dissipation was unreliable. This resulted in an oscillation of the voltage due to additional contact resistance. The battery did not reach the anticipated capacity.

EXAMPLE 2

A cathode mass mixture was produced from:
a) Manganese dioxide (EMD GH-PT, company TOSOH) tempered at 350° C.
b) The manganese dioxide was separated into two fractions using a cascade of screens with mesh sizes of 20 μm, 50 μm and 80 μm. The fractions <20 μm and >80 μm were discarded.
c) A mixture of 25% of the fine-grain fraction with a mean grain diameter of 33.4 μm and 75% of the coarser-grain fraction with a mean grain diameter of 70.2 μm was produced.
d) To form the cathode mass, 95% of the manganese dioxide mixtures was mixed with:
i) 4% expanded graphite (BNB 90, company TIMCAL) having a mean grain size of 35 μm, and
ii) 1% PTFE (TF 9207, company Dyneon).

The cathode mass was pressed as described in Example 1 to form the cathode. The density of the cathode was 3.19 g/cm³. The cathode was installed in a battery in accordance with Example 1. A PP non-woven material (Celgard 4560) of 1 mm height was used as storage body. The battery was discharged, similarly to Example 1, with 0.6 mA/cm². It can be seen in FIG. 3 that the battery can be discharged with stable voltage. The capacity reached the theoretically possible expected value.

It will be apparent to those skilled in the art that numerous modifications and variations of the described examples and embodiments are possible in light of the above teaching. The disclosed examples and embodiments are presented for purposes of illustration only. Other alternate embodiments may include some or all of the features disclosed herein. Therefore, it is the intent to cover all such modifications and alternate embodiments as may come within the true scope of this invention.

When reading the claim language, the following definitions apply. When the claim language recites A and/or B it means A alone, B alone or A and B. When the claim language recites at least one of A and B it means A alone, B alone or A and B. When the claim language recites at least one of A or B it means A alone, B alone or A and B.

The invention claimed is:

1. An electrochemical voltage source, comprising:
   an anode containing lithium and having an end face;
   a cathode containing manganese oxide and having an end face, said end face of said anode facing towards said end face of said cathode;
   a housing having a cover, said cathode and said anode disposed in an interior of said housing, surrounded by said housing and disposed opposite one another;
   an electrolyte;
   said cathode being pressed from said manganese oxide, said manganese oxide being a mixture of at least a first powdered fraction of manganese oxide and a second powdered fraction of manganese oxide, wherein said first powdered fraction of manganese oxide is formed of finer grains as compared to said second powdered fraction of manganese oxide;
   an electrolyte reservoir in a form of a compressible storage body and receiving said electrolyte at least in part in said compressible storage body, said compressible storage body disposed between said anode and said cathode, said compressible storage body having a first side resting against said end face of said cathode and a second side, which faces away from said first side, and resting against said end face of said anode, said compressible storage body having an electrically insulating material;
   a further electrolyte reservoir being in a form of a further compressible storage body, said further compressible storage body being disposed between said cover and said cathode and resting against both said cover and said cathode;
   said cathode configured to experience an increase in volume when the electrochemical voltage source is discharged; and
   said anode configured to experience a decrease in volume during the discharge, wherein, at any time during the discharge, an absolute value of a volume increase of said cathode that has occurred up to that point is at least as great as an absolute value of a volume decrease of said anode that has occurred up to that point.

2. The electrochemical voltage source according to claim 1, wherein manganese is predominantly present in said manganese oxide in an oxidation state +4, wherein said manganese oxide is tempered $\gamma$-$MnO_2$.

3. The electrochemical voltage source according to claim 1, wherein said manganese oxide has a Brunauer, Emmett and Teller (BET) surface area in a range of 15 m²/g to 20 m²/g.

4. The electrochemical voltage source according to claim 1, wherein:
   said first powdered fraction of manganese oxide has a mean grain size of 30 μm to 40 μm; and
   said second powdered fraction of manganese oxide has a mean grain size in a range of 65 μm to 75 μm.

5. The electrochemical voltage source according to claim 1, wherein:
   a proportion by mass of the first powdered fraction of manganese oxide of the mixture is 15% to 50%; and/or
   a mass proportion of the second powdered fraction of manganese oxide of the mixture is 50% to 85%.

6. The electrochemical voltage source according to claim 1, wherein said compressible storage body contains a material selected from the group consisting of a non-metal material, a polymer, a polyamide, a polyethylene, and a polypropylene.

7. The electrochemical voltage source according to claim 1, wherein said housing is hermetically sealed.

8. The electrochemical voltage source according to claim 1, wherein said cathode and/or said anode are each cylindrical shaped.

9. The electrochemical voltage source according to claim 1, wherein said housing has an inner side facing towards said cathode, said inner side of said housing has an electrically insulating surface layer.

10. The electrochemical voltage source according to claim 1,
    further comprising an electrically conductive pin; and
    wherein said cover has a through-opening formed therein, through said through-opening said electrically conductive pin is guided out from said housing, said electrically conductive pin is electrically conductively connected to said cathode, and said electrically conductive pin contains molybdenum.

11. The electrochemical voltage source according to claim 10, further comprising an insulating body, a portion of said electrically conductive pin disposed in said through-opening is surrounded by said insulating body, such that said electrically conductive pin is electrically insulated from said cover of said housing.

12. The electrochemical voltage source according to claim 1, wherein:
    said housing has an end portion; and
    said anode is electrically conductively connected to said end portion of said housing.

13. The electrochemical voltage source according to claim 1, wherein said end face of said cathode has an equivalent diameter, which is smaller than a length of said cathode along a longitudinal axis of said cathode.

14. The electrochemical voltage source according to claim 1, wherein:
    said housing is formed in an elongate manner in a direction of a longitudinal axis of said housing; and
    said cathode is disposed coaxially with the longitudinal axis and is formed in an elongate manner in the direction of the longitudinal axis.

15. The electrochemical voltage source according to claim 1, wherein:
    said cathode and/or said anode are each cylindrical;

said cathode and said anode are disposed coaxially with a longitudinal axis of said housing; and said compressible storage body is disposed coaxially with said cathode and said anode.

16. The electrochemical voltage source according to claim 9, wherein said electrically insulating surface layer contains parylene.

17. The electrochemical voltage source according to claim 1, wherein said housing has an end portion;

further comprising a dissipation grid; and wherein said anode is electrically conductively connected to said end portion of said housing via said dissipation grid.

\* \* \* \* \*